United States Patent
Ehrenberger et al.

(10) Patent No.: US 6,715,525 B2
(45) Date of Patent: Apr. 6, 2004

(54) SEPARATION DEVICES FOR MOTOR VEHICLES

(75) Inventors: Marina Ehrenberger, Esslingen (DE); Werner P. Schlecht, Vaihingen (DE); Holger Seel, Aidlingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 71 days.

(21) Appl. No.: 10/010,605

(22) Filed: Nov. 8, 2001

(65) Prior Publication Data

US 2002/0053407 A1 May 9, 2002

(30) Foreign Application Priority Data

Nov. 9, 2000 (DE) ......................................... 100 56 671

(51) Int. Cl.[7] ................................................ E06B 9/08
(52) U.S. Cl. ...................... 160/23.1; 160/301; 160/313; 296/37.16
(58) Field of Search ..................... 160/23.1, 24, 370.22, 160/296, 301, 317, 313; 296/37.16

(56) References Cited

U.S. PATENT DOCUMENTS 5,437,324 A * 8/1995 Sternquist ................... 160/299
5,971,433 A * 10/1999 Ament et al. ................ 280/749
6,086,133 A * 7/2000 Alonso ........................ 296/97.8
6,279,639 B1 * 8/2001 Schlecht et al. ............ 160/23.1

FOREIGN PATENT DOCUMENTS

| DE | 197 08 192 C1 | | 2/1997 | ............ B60R/5/04 |
| DE | 19708192 C1 | * | 4/1998 | ............ B60R/5/04 |
| DE | 19927384 C1 | * | 12/2000 | ............ B60N/2/00 |
| WO | WO 98/24660 | * | 6/1998 | |

* cited by examiner

Primary Examiner—Blair M. Johnson
(74) Attorney, Agent, or Firm—Greenberg Traurig, P.C.

(57) ABSTRACT

A separation device for a motor vehicle, with a flexible flat shaped article, which is held on a winding shaft located in a box housing between a rolled-in rest position and a pulled-out protective position which is rigidly connected to the vehicle with holding devices, in a manner so it can be rolled in and rolled out, where a return spring arrangement applies pressure in the roll-in direction onto the winding shaft. According to the invention, the return spring arrangement is formed by a series or parallel connection of a stronger wound spring and a weaker convenience spring, where the switching is designed in such a manner that, between the rolled-up rest position and a first pull-out position, the stronger roll-up force is applied, and, from the first pull-out position on, for a limited time, a smaller roll-up force is applied, for the transfer into the suspended protective position, and in that the wound spring is associated with a damping element.

7 Claims, 2 Drawing Sheets

SEPARATION DEVICES FOR MOTOR VEHICLES

BACKGROUND OF THE INVENTION

1. Technical Field of the Invention

The invention relates to a separation device for a motor vehicle with a flexible flat shaped article, which is held on a winding shaft located in a box housing between a rolled-in rest position and a pulled-out protective position which is rigidly connected to the vehicle with holding devices, in a manner so it can be rolled in and rolled out, where a return spring arrangement applies pressure in the roll-in direction onto the winding shaft.

2. The Prior Art

Such a separation device is known from WO 98/24660. The known separation device presents a flexible flat shaped article in the form of a separation net, which is held in a manner so it can be rolled in and rolled out on a winding shaft which is pivoted in a box housing. The separation net presents a dimensionally stable pull-out ledge at its front end, by means of which the separation net can be fixed, in a vertical pulled out protective position, in holding devices rigidly attached to the vehicle in the roof area of the motor vehicle. The winding shaft is associated with a relatively strong wound spring, which retracts the separation net after it has been suspended, from the holding devices rigidly attached to the vehicle, automatically in the rest position, with retraction into the box housing. In the suspended, vertical protective position, the wound spring serves the purpose of keeping the separation net tight. Because of the relatively high return forces of the wound spring, it is relatively difficult, because of the ergonomically unfavorable situation, for a person to pull the separation net out of its rest position and to suspend it in the holding devices which are rigidly attached to the vehicle. Since the box housing is accommodated in the area of storage space of the motor vehicle, an operator, to pull out the separation net, must lean at least partially into the storage space, to grab the pull-out ledge and to pull out the separation net. To obtain an ergonomically more advantageous lever, the operator must first pull the separation net approximately horizontally toward himself/herself, until the pull-out length required for the suspension has been reached. Then the pull-out ledge including the separation net is tilted upward by the operator and suspended in holding devices which are rigidly attached to the vehicle. To prevent that relatively large forces must be applied for the suspension process, during the attempted suspension, in which the separation net is held almost vertically and the operator must extend his/her arms forward to apply holding force against the return force of the wound spring, WO 98/24660 proposes a holding installation which, at least partially, eliminates the return force of the wound spring. The holding installation can be operated manually or automatically by means of a counter screw which determines the number of rotations of the winding shaft until the required pull-out length has been reached; however, it can also be switched off to achieve, after the removal from the vertical protective position, a problem-free automatic rolling up of the separation net onto the winding shaft.

In the unpublished German Patent DE 199 27 384.7, a separation device is described, which also provides for an operator friendly, at least largely low-strength, suspension of the pull-out ledge of the separation device in the vertical protective position in corresponding holding devices which are rigidly attached to the vehicle. In this patent application, the reduction of the return force is generated by a spring arrangement formed by two spring elements, where the first spring element is designed as a wound spring provided with a high return force and a second spring element is provided with a convenience spring having a weaker spring force. In this solution, the two springs are either connected in series or parallel. If the two springs are connected in series, both springs act in the same direction. Starting with a defined pull-out length, the stronger wound spring is rendered inoperative, and at the same time the weaker convenience spring is made functional. As a result, it becomes possible to suspend the pull-out ledge of the separation net with reduced force, because it is only the convenience spring which applies a corresponding return force. If the separation net is again removed from the suspension and pulled in, the convenience spring at first still acts. Then, by a corresponding mechanical switch device, an automatic switch over is carried out to the stronger wound spring, so that the latter carries out the remaining pull-in and roll-in process. In the case of parallel switching of the two springs, both springs act in the opposite direction. Up to the defined pull-out length, the stronger wound spring operates during the pulling out of the separation net from the retracted rest position. After the switch, the stronger wound spring acts against the weaker convenience spring, resulting in a lowering of the return force of the wound spring. As a result, and in the same manner, the reduced suspension forces required for the suspension in the holding devices which are rigidly attached to the vehicle, resulting in a considerably more convenient carrying out of the suspension by the corresponding operator.

The problem of the invention is to provide a separation device of the type mentioned in the introduction, which presents much improved convenience for the operator during the transfer of the flat shaped article into the vertical protective position.

This problem is solved by providing a switch which, by means of a timing element, reduces the winding force of the return spring arrangement in a pull-out position of the flat shaped article or switches it off, and switches it on again after a time period indicated by the timing element. As a result, and in a preferred manner, a short interruption of the pull-out process in any pull-out position or in a pull-out position corresponding to a predetermined length, can result in a switch process to the weak, or completely switched off, return or roll-up force. This can be advantageous, even several times during a pull-out operation, because the timing element is always switched back to the functional position. The switch, as well as the timing element, are advantageously mechanically implemented, but they can also be implemented by electrical, pneumatic or hydraulic means. The switching from the stronger pull-in force to the force-free or low-force pull-out state advantageously occurs in a path-independent manner, whereas the switch back from the force-free or low-force state to the strong winding function is time-dependent.

SUMMARY OF THE INVENTION

In an embodiment of the invention, the return spring arrangement is formed by a series-connected or parallel-connected switch of a stronger wound spring and a weaker convenience spring, resulting in a design of the switch which is such that between the rolled-up rest position and the pull-out position, a stronger winding strength becomes active, and starting with the pull-out position, a weaker winding force becomes active for a limited time, during which process the switch of the timing element is assigned in such a manner that the effectiveness of the lower winding force over a defined time period is limited, and, after the expiration of the time period, a switch over to the stronger winding force occurs.

The principle of the spring switch function, as well as the fundamental advantages, correspond to the solution already disclosed in DE 199 27 384.7. In the case of series-connection, the stronger wound spring and the weaker convenience spring act in the same direction. In the case of a parallel switch, the wound spring and the convenience spring act in opposite directions, so that the return force of the wound spring is decreased by the convenience spring. In contrast, in the series connection, the wound spring is switched off, in a simple manner in the first pull-out position, and only the weaker convenience spring is still active. In contrast to the solution described therein, the solution according to the invention does not provide path-dependent, rather it provides for time-dependent, switch from the weaker to the stronger winding force. As a result of the timing element, the smaller winding force is maintained over a defined time period, which depends on the design of the timing element and the incorporation of the timing element in the switch. Thus, the operator has more time available to suspend the flexible flat shaped article, in particular, the separation net, from the first pull-out position into holding devices which are rigidly attached to the vehicle, without the application of the increased return force in the meantime. In addition, after the suspension in the protective position, and after the elapse of the time period, an automatic switch to the stronger winding force occurs, so that, during the renewed operation of pulling into the rest position, the stronger winding force immediately becomes active.

In an additional embodiment of the invention, the wound spring and the convenience spring are achieved by means of a switch installation, which presents a switch element, which acts in cooperation with a time element by means of toothing. The toothing forms a drive, whose translation ratio is appropriate for defining the desired time period which should be available for a convenient operation of suspending, with reduced return force.

In an additional embodiment of the invention, the timing element is designed as a rotating element provided with a pinion, which is positioned off-center with respect to the rotating axis of the winding shaft, and rigidly attached to the housing. The timing element is designed, in particular, as a viscosity brake.

In an additional embodiment, the switch element is in a position which is coaxial with respect to the winding shaft, and it is provided over at least a partial section of its circumference with circumferential toothing. The number of teeth of the pinion, on the one hand, and the radius as well as the number of teeth of the circumferential toothing, on the other hand, define the transformation ratio between the switch element and the viscosity brake, that is the timing element, so that the time span, which is available for the effectiveness of the lower winding force, can be adjusted accordingly.

Additional advantages and characteristics of the invention can be obtained from the claims as well as the following description of preferred embodiment examples of the invention, which are represented with reference to the drawings.

DETAILED DESCRIPTION OF THE DRAWINGS

Figure 1:
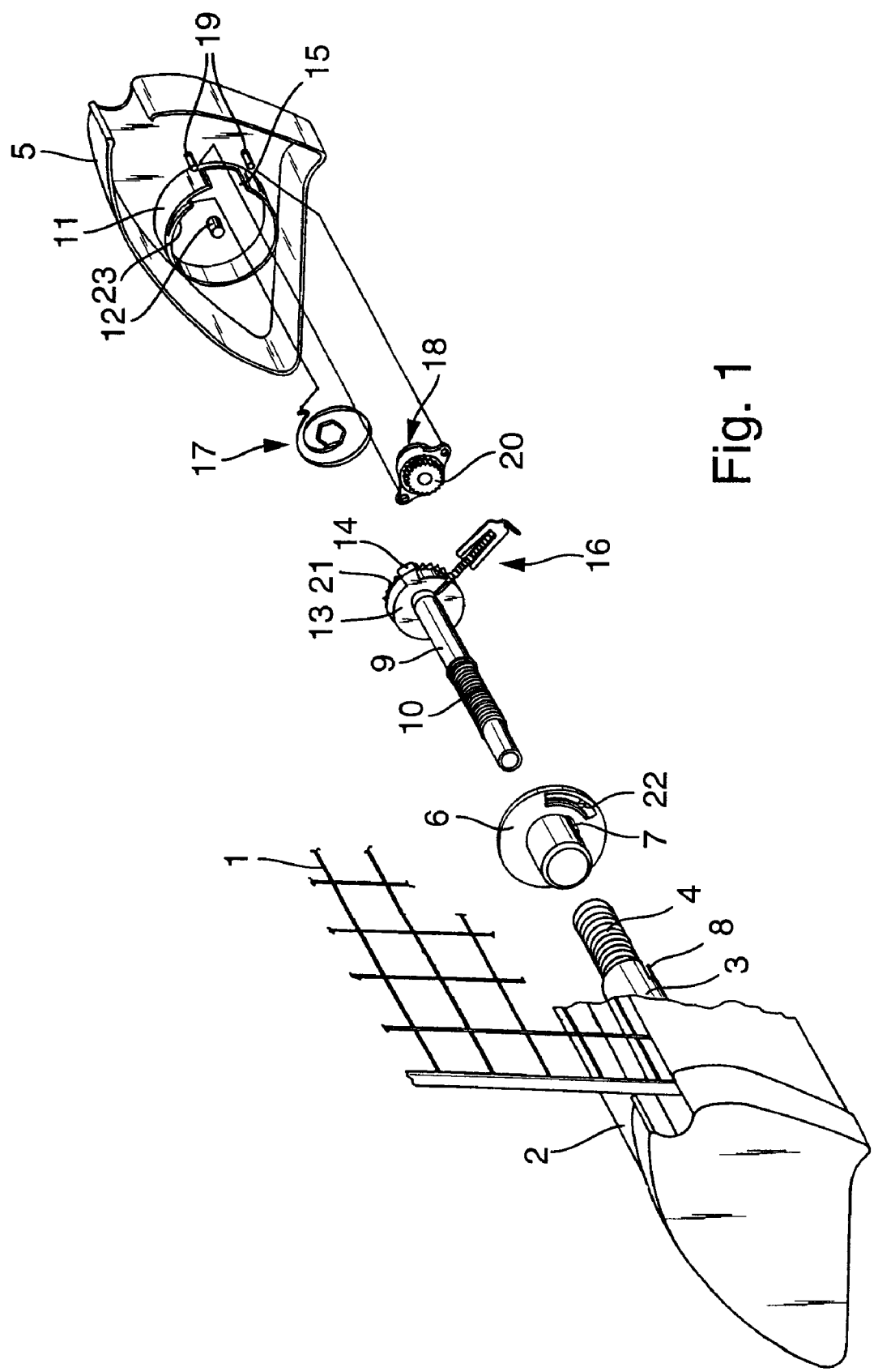
FIG. 1 shows a perspective exploded view of the first embodiment variant of the separation device according to the invention.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

Figure 2:
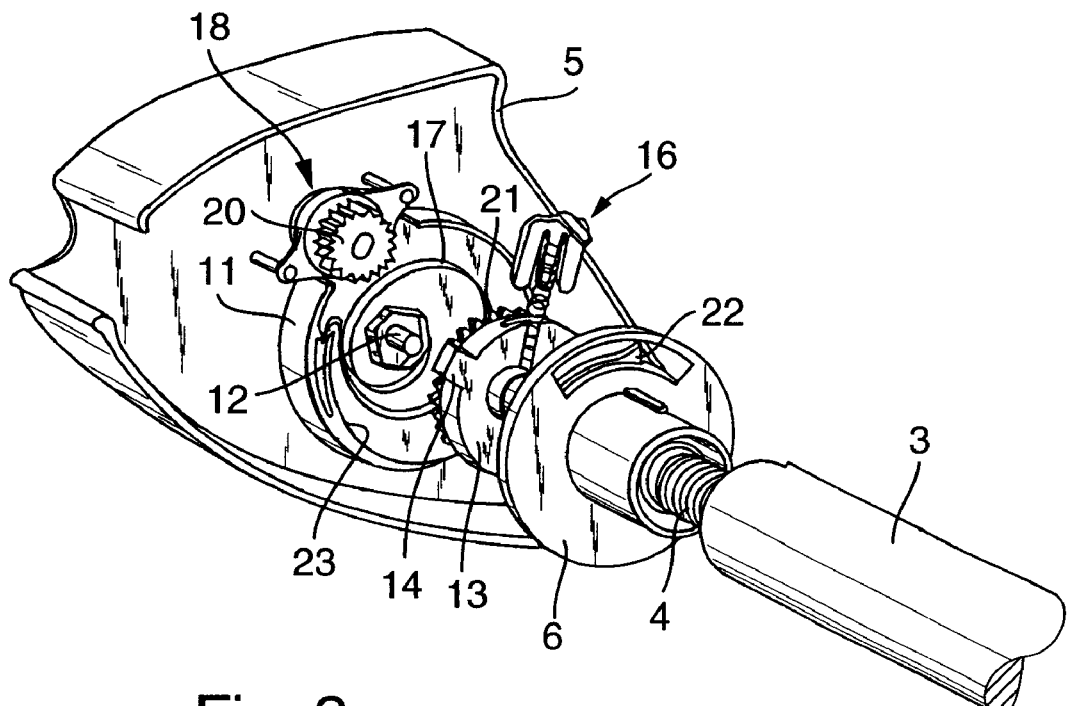
FIG. 2 shows an enlarged, partially assembled exploded representation of the separation device according to FIG. 1.

The separation device according to FIGS. 1 and 2 presents, as flexible flat shaped article, a separation net 1, which is held on the winding shaft 3 in a manner so it can be rolled in and rolled out. The winding shaft 3 is rotably arranged in a box housing 2. The winding shaft 3 is designed as a hollow shaft, in which a wound spring 4 designed as a coil spring is arranged. As can be seen in FIG. 1, the wound spring 4 is attached at its external front end to a driving collar 9 of the switch element 13 in the area of the external threading 10 provided on the driving collar 9. The driving collar 9 of the switch element 13 can be inserted coaxially with respect to the winding shaft 3 into a front end of the winding shaft 3. The switch element 13 presents, on a front end of the driving collar 9 which is turned away from the winding shaft 3, a radial annular shoulder, which is provided with an abutment cam 14 which extends outward. By means of a corresponding central bearing bore, on the front side of the annular shoulder which is located opposite the driving collar 9, the switch element 13 is arranged, in a manner allowing limited rotation, on a central pivot pin 12 in a lateral part 5 of the box housing 2, which is rigidly attached to the housing. To receive the annular shoulder of the switch element 13, the lateral part 5 presents a beaker-like housing section 11, which is provided in the area of the abutment cam 14 with a recess 15, which runs in the shape of a defined arc of a circle of the beaker-shaped housing section 11. The recess 15 serves the function of placing a timing element, in the form of a viscosity brake 18, which in the represented embodiment example is designed as a silicon brake, in a position close to the switch element 13.

In the annular shoulder of the switch element 13, radially linearly moveable slide 16 is arranged, which is provided, at its external front end, with a counter finger which extends axially toward the winding shaft 3. The slide 16 is pressed by a pressure spring radially toward the outside. Together with the slide 16 and the associated counter finger, a counting volute, including bearing sleeve 6 works in cooperation, which is provided as a spiral-shaped sliding guide in a front side, which is turned toward the switch element 13, of an annular shoulder of a bearing sleeve 6. The bearing sleeve 6 can be inserted by sliding with an insert sleeve section on the front side into the winding shaft 3, and it can be firmly connected to the latter by a driving key and slot arrangement 7,8. The spiral groove used as counting gear, in a radially external spiral path, spring-elastic yielding abutment bar 22, which forms, in the direction of rotation, a stoppage for the counter finger of the slide 16, and which can serve as a switch for the counter finger, when the pressure force is rendered inoperative on the slide as a result of a corresponding counterforce. In the direction opposite the direction of rotation, the counter finger of the slide 16 can run over, toward the interior, of the abutment flange 22 with elastic bending. The counter element and the associated slide 16, as well as the counter finger which is formed on it, can be designed according to the embodiment variants described in DE 199 27 384.7.

The switch element 13 is provided, on its front side turned toward the lateral part 5, concentrically with respect to the bearing recess which can be firmly inserted on the pivot pin 12 having a hexagonal head, which is not visible, on which one can slide, with positive lock, a hexagonal internal ring end of a spiral spring 17. An external front end of the spiral spring 17 is suspended in a cam flange 23 which, opposite the cylindrical wall of the beaker-shaped housing section 11, in a manner of a spiral leads further inside, as can be seen in FIGS. 1 and 2. The cam flange 23 in addition is used to limit the passive rotation of the abutment cam 14 and to steer the slide 16 radially toward the interior, together with the counter finger, in the case of a corresponding rotation switch element 13.

The path of rotation of the switch element 13 is limited here to approximately 270°. The limitation occurs as a result of the working together of the abutment cam 14 with the ends of the control flange 23, located at its front or backside in the circumferential direction. The abutment cam 14 thus is either located at one end of the control flange 23, where the spiral spring 17 is also suspended, or the abutment cam 14 reaches, at the opposite arc-shaped bevel of the control flange 23, the installation, in which the control flange 23 gradually extends with bending toward the interior in the manner of a spiral, away from the cylindrical wall of the housing section 11. The control ledge 23 is designed so as to form one part with the housing section 11 and the lateral part 5.

The silicon brake 18 is connected rigidly to the lateral part 5 by means of two holding pins 19. The silicon brake, on its side turned toward the switch element 13, presents a pinion 20, which meshes with the circumferential toothing 21 of the switch element 13. The circumferential toothing 21 is radially inside the passive movement of the abutment cam 14 connected, so as to form one part, to the front side of the annular shoulder of the switch element 13. The circumferential toothing 21 does not have to extend over the entire circumference of the switch element 13, because the switch element 13 cannot perform a complete rotation.

The spiral spring 17 serves as a convenience spring in the sense of the invention.

Below, the method of operation of the present separation device according to FIGS. 1 and 2 is described, where the fundamental function, in particular of the switching from a stronger wound spring 4 to a weaker convenience spring 17 corresponds to the solution described in DE 199 27 384.7. In the represented embodiment example, the wound spring 4 and the spiral spring 17 acting as convenience spring act in the same direction so that the wound spring 4 and the spiral spring 17 are designed in a series connection.

In the rolled-up rest position of the separation net 1, the abutment cam 14 of the switch element 13 is located in the cam 23 area as a result of the force of the wound spring 4, which engages with its front end which is turned away from the switch element 13 with the winding shaft 3. The switch element 13 with its abutment cam 14 thus serves as support which is rigidly attached to the housing for the wound spring 4 in this position. Nothing in this situation changes even during the beginning of the pulling out of the separation net 1. It is only after a defined pull-out length has been reached, which corresponds to at least one rotation of the count finger in the spiral groove, that is after at least one single instance of the abutment flange 22 having been passed over, that a switch to a smaller or almost nonexistent winding force can occur-depending on the design of the spiral spring 17. Depending on the chosen pull-out length, the spiral guide is run through one or more times, where the abutment flange 22 is passed over one or more times. During each passage, the counter finger which moves into the spiral guide, moves over the abutment flange 22, pushing it away. As a result of a brief decrease of pull-out force on the separation net 1, the winding shaft 3 is again pulled back by the still existing return force of the wound spring 4 by a certain amount, resulting in the counter finger also running back together with the slide 16 into the spiral groove over a small distance. Then it abuts against the abutment flange 22 from the opposite side, so that the abutment flange 22 applies its locking effect. From this time on, the wound spring 4 is no longer active, because the switch element 13 is now blocked to the bearing sleeve 6 which is firmly attached to the winding shaft 3. The winding shaft 3 and the separation net 1 can now be moved with reduced force, because only the spiral spring 17 exerts force. The spiral spring 17 serves as a drive spring and, when the separation net 1 is not moving, when no additional pull-out motion occurs, it gradually turns back the switch element 13 against the brake strength of the timing element, that is the silicon brake 20, until the switch element 13 again runs firmly against the cam 23. Shortly before the abutment cam 14 has reached the arc-shaped bevel of the cam 23, the counter finger and the slide 16 run over the arc-shaped bevel and the cam part 23, resulting in the counter finger and the slide 16 being pushed back, radially toward the interior, against the pressure force of its pressure spring as it slides along the cam 23. As a result, the counter finger is pushed back, under the abutment flange 22 designed as a switch, into the next internal spiral path, resulting again in the release of the lock of the wound spring 4. By means of the timing element it is also guaranteed that, in the case of a renewed suspension of the pull-out ledge from the suspended protecting position, the return force of the strong wound spring is immediately applied.

The separation net 1 is pulled out of a retracted rest position into a first pull-out position, in which, advantageously, the pull-out length of the separation net 1 is smaller than the pull-out length used for the suspension in the holding devices which are rigidly attached to the vehicle. An additional pulling out to reach the pull-out length required for the suspension, starting at this first pull-out position, occurs now only against the return force of the spiral spring 17, as long as the timing element is active.

It is an essential advantage that the switching of the timing element can also occur several times, by pulling the separation net out again after the elapse of the first time period by at least one spiral rotation, which again results in the switch process described above, and the strong wound spring is again switched off with simultaneous switching of the timing element.

In the case of a renewed suspension of the separation net 1, from the suspended protective position, the stronger wound spring 4 is immediately used, because, in the mean time, the spiral spring 17 which serves as drive spring, has again brought the switch element 13 and the abutment cam 14, against the braking force of the silicon brake, close to the abutment of the cam 23, located in front in the clockwise direction, on which the spiral spring 17 is then suspended.

Figure 3:
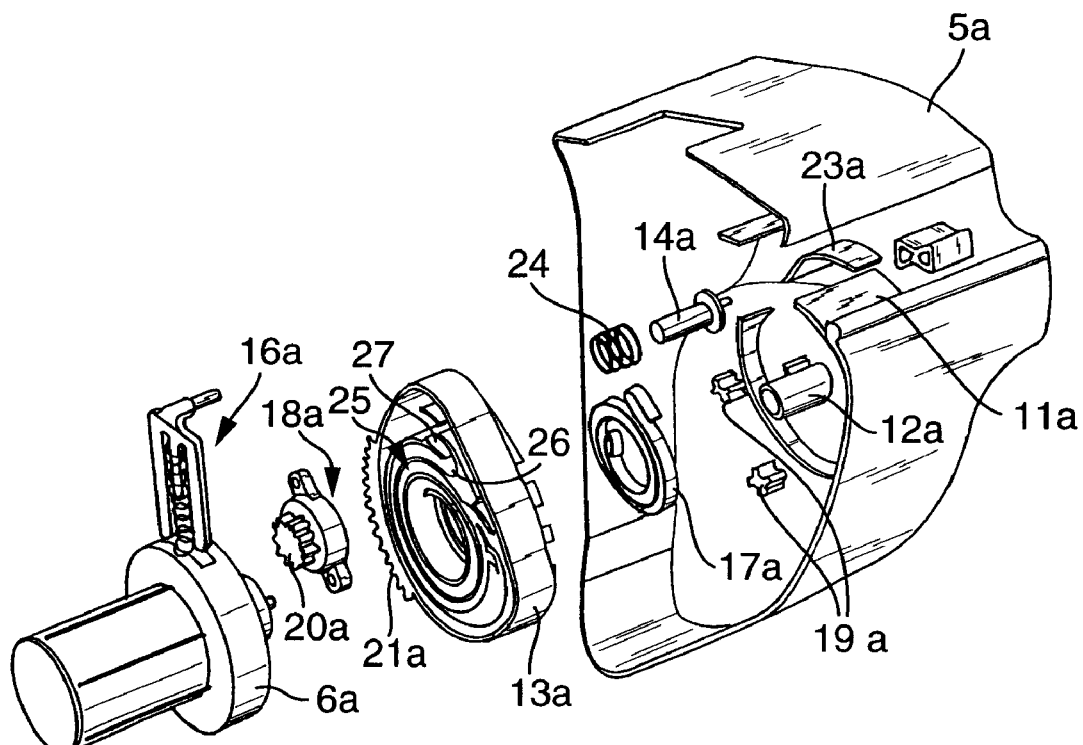
FIG. 3 shows a switch device for an additional embodiment variant of a separation device according to the invention, similar to FIG. 1, and also in an exploded representation.

In the embodiment example according to FIG. 3, the same function is achieved as in the embodiment example according to FIGS. 1 and 2. The essential difference in the embodiment example according to FIG. 3 is that the switch processes for switching off and on the strong roll-up force of the wound spring 4 take place differently than was the case in the embodiment examples of FIGS. 1 and 2, so that, instead of a serial connection, a parallel connection is used between the wound spring and the spiral spring 17a. For better visibility, in the embodiment according to FIG. 3, parts having the same function are identified by the same reference numerals, with the only difference that the letter a is added. In the embodiment according to FIG. 3, the bearing sleeve 6a is also firmly connected to the winding shaft which is not represented in further detail. In contrast to the embodiment example according to FIGS. 1 and 2, however, in this embodiment, the slide 16a is arranged in a manner allowing radially linear movement in the bearing sleeve 6a, and the counter element 25 is provided at the switch element 13a. The counter element 25 presents a spiral groove, which is provided with an abutment baffle 26 in a radially external area. Immediately adjacent to the abutment baffle 26, an axial bearing recess 27, which is only suggested, is provided for an abutment pin 14a, which can undergo linear movement parallel to the axis of rotation of the switch element 13a, and to which pin a pressure spring 24 applies pressure in an axial direction turned away from the bearing sleeve 6a. The switch element 13a which is provided with the counter element 25, is arranged so it can rotate within limits, on a pivot pin 12a of the lateral part 5a in a housing section 11a, where the freedom of rotation is limited to an angle of rotation of less than 90°. The limitation of the rotational movement of the switch element 13a occurs by the abutment pin 14a, which abuts against the opposite lateral edges of the open, beaker-like, housing section 11a. On the axially opposite side with respect to the switch element 13a, a back-side front end of the abutment pin 14a is associated with a cam contour 23a, which presents, in the axial direction—with reference to the axial moveability of the abutment pin 14a—an inclination in the axial direction. The abutment pin 14a is provided in a radially warped area of the switch element 13a and it is thus located at the height of the lateral edges of the walls of the housing section 11a, in such a manner that is abuts during a rotation of the switch element 13a against the corresponding lateral edge. At the same time, it is led in its axial movement by running along the cam contour 23a, allowing it to move out of the bearing recess 27 of the spiral groove, or into it.

In addition, silicon brake 18a is associated with the switch element 13a as timing element, which brake is attached to the lateral part 5a by means of the holder braces 19a. The silicon brake 18a presents a pinion 20a, which meshes with a circumferential toothing 21a of the switch element 13a. The circumferential toothing 21a is formed only over a partial area of the circumference of the switch element 13a corresponding to the limited rotational moveability of the switch element 13a.

The method of operation of the separation device according to FIG. 3 is as follows:

In the retracted rest position of the separation net, the winding shaft is in starting position, as a result of the wound spring which is not represented. The wound spring, in this embodiment, is supported, with rigid attachment to the housing, on its side opposite the lateral part, and it is applied with the other front end to the winding shaft. The switch element 13a, because of the abutment pin 14a, is also positioned in the final position with rigid attachment to the housing. At the beginning of the pulling out of the separation net, the counter finger of the slide 16a thus gradually rotates radially toward the outside in the counter element 25, until it abuts against the abutment baffle 26. The abutment pin 14a is in a locking position which locks the spiral path which follows the abutment baffle 26. As a result of a brief loosening of the separation net, the winding shaft and thus the counter finger tend to turn backward in the counterclockwise direction, and the counter finger abuts against the abutment pin 14a. As a result, the force of the wound spring is transferred to the switch element 13a. However, the switch element 13a is associated with the spiral spring 17a, which is supported at its other end by the lateral part 5a. The spiral spring 17a, in contrast to the above-mentioned solution, acts in the opposite direction with respect to that of the wound spring, so that in this case a functional parallel connection of the wound spring and of the spiral spring 17a serving as convenience spring is used. The spring force of the spiral spring 17a is smaller than the winding force of the wound spring which acts in the opposite direction. As a result, the winding force of the wound spring, starting from this switch process resulting from the opposite force of the spiral spring 17a, is reduced, so that only a considerably reduced return force is applied. This force is used as the drive force for the rotation of the switch element 13a against the brake force of the silicon brake 18a which operates as a timing element, and which freely runs in the direction opposite the direction of rotation. In addition, it is also possible to achieve a return function for the separation net 1a. During the process of rotation of the switch element 13a, the abutment pin 14a runs along the cam contour 23a, which decreases in this direction of rotation, resulting in the gradual steering of the abutment pin 14a toward the back out of the bearing recess 27 inside the counter element. At the back end—seen in the counterclockwise direction—of the recess in the beaker-shaped housing section 11a, the abutment pin 14a abuts against the lateral edge of the walls of the housing section 11a, and at the same time it is completely retracted out of the spiral groove in the area of the bearing recess 27. As a result, the counter finger of the slide 16a and thus also the wound spring are again released, whereas the spiral spring 17a, as drive spring, is again inactivated as a result of the abutment of the switch element 13a with the housing. The strong roll-up force of the wound spring thus pulls the separation net again in the roll-up direction, whereas, as a result of the abutment of the switch element 13a, the timing element is inactivated.

The counter element 25 of the switch element 13a is, moreover, designed in such a manner that in the outermost spiral path the counter finger can perform several rotations, which is advantageous, particularly in the case when the seat back is tilted back, because in that case a very long distance of pulled out net is required. In FIG. 3, the design is shown for the counter element 25, including the yielding track switch, which is not further identified, which allows the steering of the count finger into the next spiral path toward the interior. Reference to this fact is specifically made here.

The foregoing description and drawings merely explain and illustrate the invention, and the invention is not limited thereto except insofar as the appended claims are so limited, inasmuch as those skilled in the art, having the present disclosure before them, will be able to make modifications and variations therein without departing from the scope of the invention.

What is claimed is:

1. Separation device for a motor vehicle with a flexible flat shaped article, which is held on a winding shaft located in a box housing between a rolled-in rest position and a pulled-out protective position which is rigidly connected to the vehicle with holding devices, in a manner so it can be rolled in and rolled out, where a return spring arrangement applies pressure in the roll-in direction onto the winding shaft, characterized in that a switch is provided which reduces, with time limitation, or switches off, by means of a timing element (18, 18a20) the roll-up force of the return spring arrangement (4, 17; 17a) in a pull-out position of the flat shaped article (1, 1a), or which switches the return spring arrangement (4, 17, 17a) timing element (18, 18a) on again after a predetermined time period.

2. Separation device according to claim 1, characterized in that the return spring arrangement (4, 17, 17a) is formed by a serial or parallel connection of a stronger wound spring (4) and a weaker convenience spring (17, 17a) where the switch is designed in such a manner that, between the rolled-up rest position and the pull-out position, a stronger roll-up force is applied, and, from the pull-out position on, a weaker pull-up force, with time limitation, and where the switch of the timing element (18, 18a) is arranged in such a manner that the effectiveness of the lower winding force is limited to a predefined time period, and, after the expiration of the time period, a reswitching to the stronger winding force occurs.

3. Separation device according to claim 1, characterized in that the timing element (18) is provided in the opposite direction of the winding direction with an idle.

4. Separation device according to claim 1, characterized in that, as timing element, a viscosity brake, in particular a silicon brake (18) is used.

5. Separation device according to claim 2, characterized in that, to achieve the switching of the wound spring (4) and the convenience spring (17), the switch (13, 6, 16, 22) is provided with a switch element (13, 13a), which works in cooperation with circumferential toothing (21) and with the timing element (18, 18A 20).

6. Separation device according to claim 5, characterized in that the timing element (18, 18A 20) is designed as a rotating element provided with a pinion, which is positioned, with rigid attachment to the housing, in a position which is not aligned with the axis of rotation of the winding shaft (3).

7. Separation device according to claim 1, characterized in that the switch element (13 13A) is arranged in a manner which allows limited rotation coaxially with respect to the winding shaft, and at least a partial section of its circumference is provided with a circumferential toothing (21).

* * * * *